Patented Mar. 19, 1946

2,396,859

UNITED STATES PATENT OFFICE 2,396,859

CHEMICAL TREATMENT

John W. Latchum, Jr., Bartlesville, Okla., assignor to Phillips Petroleum Company, a corporation of Delaware No Drawing. Application October 5, 1942,
Serial No. 460,859

14 Claims. (Cl. 260—683.5)

This invention relates to hydrocarbon conversions, and more particularly to the purification of fluid reaction effluents from hydrocarbon conversions carried out in the presence of an anhydrous normally solid or liquid metal halide of the Friedel-Crafts type which is readily volatilizable or highly soluble in the effluent and in the presence of anhydrous hydrogen halide, which effluents contain hydrocarbons, usually both the original and the product hydrocarbon in addition to any by-products, volatilized metal halide and hydrogen halide, as well as other organic material whose chemical identity is not clearly understood at present.

Still more particularly the invention relates to isomerization of normal paraffins to the corresponding iso-paraffins, and especially of normal butane to isobutane, by means of a metal halide catalyst of the type referred to above and in the presence of anhydrous hydrogen halide, usually corresponding to the metal halide catalyst. Usually the metal halide catalyst is an aluminum halide, generally aluminum chloride or bromide. Even more specifically the invention relates to such a process wherein the reaction effluent leaves the isomerization unit in the vapor or liquid phase and is subjected to a purification treatment to remove therefrom the volatilized or dissolved metal halide catalyst contained therein and the organic material other than paraffins, while allowing the hydrogen halide to remain unaffected.

At the present time, hydrocarbon conversions effected with the aid of aluminum chloride or the like metal halide catalyst, are characterized by the difficulty that the catalyst permeates the entire system causing numerous troubles including corrosion, further reaction, clogging, etc. This is especially objectionable in those sections of the equipment which follow the conversion unit. Thus, where the effluent is removed in the vapor phase and, as is almost invariably the case where catalysts of the type described above are used, where the catalyst is readily volatilizable, the effluent contains substantial quantities of vaporized catalyst, and this catalyst in processes heretofore practiced deposits in the equipment after the converter. Again, where the effluent is removed in the liquid phase, it contains substantial quantities of dissolved or dissolved and suspended catalyst which causes difficulties in subsequent processing.

The principal object of my invention is to provide a process overcoming the foregoing difficulties. Another object is to provide a convenient, economical and highly satisfactory process of purifying the reaction effluents from hydrocarbon conversions of the type outlined above. Another object is to effect removal of the volatilized catalyst from vaporous effluents of the above type. Still another object is to effect removal of the dissolved catalyst from liquid effluents of the type described above. Another object is to purify the reaction effluents in such manner as to remove not only the catalyst contained therein, but also the major part or all of the organic material other than pure hydrocarbon, including complexes formed between the metal halide catalyst and hydrocarbons and other compounds whose exact chemical nature is at present but little understood. Another object is to provide a process of the type set forth above wherein the hydrogen halide in the reaction effluent is for the most part not removed therefrom but is left in the residual hydrocarbon, which is a distinct advantage since this very valuable hydrogen halide may be very easily recovered from the treated hydrocarbon for recycle to the conversion. Numerous other objects will hereinafter appear.

In accordance with the present invention, a reaction effluent of the type described in detail above is purified by treatment with a liquid phosphoric acid. I have discovered that upon treating the effluent, preferably immediately following the catalyst chamber, with a liquid phosphoric acid, the metal halide catalyst contained therein is substantially completely or entirely removed therefrom. At the same time non-hydrocarbon organic material of but little understood nature such as complexes of metal halide with hydrocarbon, etc., is also removed in substantial entirety.

A distinct advantage of this purification method is that the hydrogen halide content of the effluent is substantially unaffected by the phosphoric acid with the result that it passes through the treatment along with the hydrocarbon product and unconverted hydrocarbon contained in the effluent. Only that small amount of hydrogen halide required to saturate the phosphoric acid treating medium is removed from the effluent, the entire amount of hydrogen halide passing through unchanged after this saturation.

As the liquid phosphoric acid employed as the absorbent in my invention, I prefer to use a normally liquid acid, particularly aqueous orthophosphoric acid containing at least 15% of water, i. e. ranging from 85% $H_3PO_4$ down to 50% or even more dilute. Any of the commercially available grades may be used namely the 50%, 75% or 85% acids. I prefer the 85% orthophosphoric acid of commerce since it contains the least water of any of the commercially available grades.

Instead of orthophosphoric acid, I may use other normally liquid phosphoric acids such as tetraphosphoric acid which contains no free water and which is now commercially available. Another phosphoric acid which may be used is pyrophosphoric acid which likewise contains no water except that of chemical combination.

While for purposes of convenience in handling the acid absorbent used should be liquid at ordinary atmospheric temperatures, I may use a phosphoric acid which is solid at such temperatures but attains the liquid state at the temperature of the absorption.

For carrying out the treatment of the effluent, I may use any convenient equipment such as a packed column, a bubble-type column or any other means commonly used for scrubbing a gas with a liquid absorbing medium or for effecting intimate liquid-liquid contacting.

The process is particularly applicable to effluents in which the hydrocarbons present are paraffins in type. Thus it has particular advantage in the treatment of the effluent from the isomerization of normal paraffins to isoparaffins since substantially the only hydrocarbons found in the effluent from such a process are paraffins including the isoparaffin product and unconverted normal paraffin.

However, the process may be applied to effluents from conversions other than paraffin isomerization. For example, it may be employed to purify the effluent from the metal halide-catalyzed alkylation of isoparaffins with low-boiling olefins, where such effluent does not contain an undue amount of olefins. It will be understood that olefins are very readily polymerized by phosphoric acids and so may be at least partially converted to the polymer in the treatment.

An example of another effluent which may be treated by the present invention is that from the cracking of high-boiling petroleum oils to make gasoline in the presence of aluminum chloride or the like and hydrogen chloride. Such an effluent contains little or no non-paraffins and so is very advantageously treated by the process of my invention.

I prefer to apply my invention to a vaporous effluent, such as the vaporous effluent from the isomerization of normal butane to isobutane in the presence of aluminum chloride or bromide and the corresponding hydrogen halide. In such an application, I scrub the vaporous effluent with the liquid phosphoric acid, for example, in an absorber directly following the catalyst chamber. Since normal paraffins and isoparaffins are unaffected by the phosphoric acid, the treated effluent consists of the isoparaffin, the unconverted normal paraffin, and any lighter paraffins formed in the converter, and practically all of the hydrogen halide. This mixture may be readily treated by known methods to recover the hydrogen halide for recycle.

By the foregoing treatment of the effluent, the phosphoric acid absorbing medium removes substantially all of the metal halide content of the effluent, as well as the organic material other than hydrocarbon. It is believed that the metal halide is removed by chemical reaction to form the corresponding metal phosphate and also partially by adsorption, absorption, etc.

The removal of the metal halide by chemical reaction involves the generation of the hydrogen halide coresponding to the metal halide catalyst. This is a distinct advantage since metal halide which might otherwise be wasted or lost is thus converted to hydrogen halide which is available for recycle as promoter for the conversion. This is especially advantageous where the metal halide entering the reaction is combined or dissolved in the form of a complex or sludge.

The temperature used in the purification treatment may vary widely. Where, as in the preferred embodiment, a vaporous effluent is being treated it is preferred to use temperatures sufficiently high that condensation of the hydrocarbons being treated is prevented but not so high that the phosphoric acid is vaporized to an objectionable extent, whereby the treated effluent would be contaminated therewith.

However, it is perfectly possible when treating vaporous effluent, to operate the phosphoric acid absorption step at a temperature such that condensation, partial or complete, of the hydrocarbon content thereof takes place. As will be understood, whether condensation takes place or not and, if so, to what extent depend also upon the pressure maintained in the absorption step. This pressure may be substantially the same as that in the conversion step or it may be materially higher or lower than said pressure by the use of suitable pressure increasing means (e. g. a pump or compressor) or pressure reducing means between the catalytic converter and the absorber. In practice it is preferred to carry out the absorption step at a lower pressure so that the temperature thereof may be correspondingly lower than that of effluent vapors leaving the converter.

The absorber may, if desired, function as a cooler and/or a quencher for the vaporous effluent where the said vapors are at a temperature materially higher than the phosphoric acid absorption medium. Thus the quenching, i. e. rapid cooling of the hot reaction effluent, may serve to prevent re-reaction between the reaction products.

Where a vaporous effluent is treated in the absorber in such manner that condensation of hydrocarbons contained in the effluent occurs, layer separation is allowed to take place, preferably continuously in any suitable manner obvious to those skilled in the art. The phosphoric acid phase is separated from the hydrocarbon layer and each further treated in any desired manner.

Where a liquid reaction effluent is treated with the phosphoric acid in accordance with the invention, the treatment may be conducted at any temperature ranging from the freezing point upwards but preferably below the boiling point. The treatment may be conducted in any apparatus known to be suitable for intimate liquid-liquid contacting, following which the separation of phases is made and the two separated phases, raffinate and extract, further processed separately in any suitable way.

As an example of the invention, the vaporous effluent from the vapor phase isomerization of normal butane to isobutane at a pressure of 150 pounds per square inch gauge and a temperature of 210–250° F. over lump aluminum chloride and in the presence of hydrogen chloride as a promoter, is passed at said temperature and pressure from the converter through pressure-reducing means and then through a cooler to bring said effluent to a temperature approaching 100° F. while still maintaining the vapor phase. The gaseous effluent is then scrubbed in an absorption unit at about 100° F. with 85% orthophosphoric acid which is at a temperature of 100° F. All of the aluminum chloride vapors and fines in the vapors are removed. In addition the aluminum chloride complexes are broken down so that the effluent contains no aluminum chloride either free or combined. The scrubbed effluent was in the vapor phase and consisted of isobutane, normal butane, virtually all of the hydrogen chloride which left the isomerizer, and small quantities of lighter gases than $C_4$ including propane.

After the absorption medium is spent, it may be either discarded or repurified for reuse. This recovery may be carried out in any suitable manner known to the art to be practicable.

The process may be operated in either a batchwise or a continuous manner, the latter being preferred. Thus the vapors leaving a continuously operated isomerization unit may be continuously passed to the absorption unit into which fresh absorbing medium is continuously introduced. Rich or spent phosphoric acid is continuously withdrawn at the same rate as the fresh was introduced. The treated effluent is continuously passed in vapor form to a unit where the hydrogen chloride is continuously separated and a suitable portion or all thereof recycled. The unconverted normal butane may be separated from the isobutane in the same or a separate unit and recycled for further conversion.

While an aluminum halide, namely either aluminum chloride, bromide or very infrequently, iodide, is most commonly used as the catalyst in carrying out my invention, other metal halides of the Friedel-Crafts type and which are normally either liquid or solid, usually the latter, may be used. Examples are the chlorides, bromides or iodides of the following metals:

| | |
|---|---|
| Zinc | Titanium |
| Tin | Iron |
| Arsenic | Boron |
| Antimony | Beryllium, etc. |
| Zirconium | |

It will be understood that many changes may be made in the detailed embodiments described above and that the invention is to be taken as limited only by the terms or spirit of the appended claims.

I claim:

1. The process which comprises intimately contacting the reaction effluent from a hydrocarbon conversion catalyzed by a metal halide of the Friedel-Crafts type in the presence of a hydrogen halide which effluent contains a substantial amount of said catalyst and of said hydrogen halide in addition to hydrocarbon, with a liquid phosphoric acid containing at least 50% of phosphoric acid and thereby effecting substantially complete removal of said catalyst therefrom without removing the hydrogen halide.

2. The process which comprises intimately contacting the reaction effluent from a hydrocarbon conversion catalyzed by a metal halide of the Friedel-Crafts type in the presence of a hydrogen halide which effluent contains a substantial amount of said catalyst and of said hydrogen halide in addition to hydrocarbon, with liquid aqueous orthophosphoric acid containing at least 50% of orthophosphoric acid and thereby effecting substantially complete removal of said catalyst therefrom without removing the hydrogen halide.

3. The process which comprises intimately contacting the reaction effluent from a hydrocarbon conversion catalyzed by a metal halide of the Friedel-Crafts type in the presence of a hydrogen halide which effluent contains a substantial amount of said catalyst and of said hydrogen halide in addition to hydrocarbon, with liquid aqueous orthophosphoric acid containing from 50 to 85% $H_3PO_4$ and thereby effecting substantially complete removal of said catalyst therefrom without removing the hydrogen halide.

4. The process which comprises intimately contacting the reaction effluent from a hydrocarbon conversion catalyzed by a metal halide of the Friedel-Crafts type in the presence of a hydrogen halide which effluent contains a substantial amount of said catalyst and of said hydrogen halide in addition to hydrocarbon, with liquid orthophosphoric acid containing 85% $H_3PO_4$ and 15% of water and thereby effecting substantially complete removal of said catalyst therefrom without removing the hydrogen halide.

5. The process which comprises intimately contacting the reaction effluent from a hydrocarbon conversion catalyzed by a metal halide of the Friedel-Crafts type in the presence of a hydrogen halide which effluent contains a substantial amount of said catalyst and of said hydrogen halide in addition to hydrocarbon, with substantially anhydrous tetraphosphoric acid and thereby effecting substantially complete removal of said catalyst therefrom without removing the hydrogen halide.

6. The process of removing aluminum halide from a vaporous effluent from a hydrocarbon conversion catalyzed by a volatilizable aluminum halide in the presence of the corresponding hydrogen halide as a promoter, said vaporous effluent containing hydrocarbon, hydrogen halide and vaporized aluminum halide, which comprises scrubbing said effluent in the vapor phase with a liquid phosphoric acid containing at least 50% of phosphoric acid and thereby effecting substantially complete removal of aluminum halide therefrom without removing the hydrogen halide.

7. The process of removing aluminum chloride from the effluent vapors resulting from the isomerization of normal butane to isobutane by means of aluminum chloride and hydrogen chloride, said effluent vapors containing volatilized aluminum chloride, normal butane, isobutane and hydrogen chloride, which comprises scrubbing said effluent in the vapor phase and at an elevated temperature with a liquid phosphoric acid containing at least 50% of phosphoric acid under such conditions that all of the aluminum chloride content of the effluent is removed by reaction with said acid to form hydrogen chloride which appears in the scrubbed effluent, and separately removing from the scrubbing zone the resulting liquid phase and the treated vaporous effluent free from aluminum chloride and containing normal butane, isobutane and substantially all of the hydrogen chloride present in the original effluent vapors and formed from said aluminum chloride in said scrubbing step.

8. The process of removing volatilized aluminum chloride from the effluent vapors resulting from the isomerization of normal butane to isobutane in the presence of aluminum chloride and hydrogen chloride, which effluent contains a volatilized aluminum chloride, normal butane, isobutane and hydrogen chloride, which comprises continuously scrubbing said effluent in the vapor phase and at an elevated temperature directly upon its leaving the isomerization step with 85% orthophosphoric acid under such conditions that all of the aluminum chloride content of the effluent is removed by reaction with said acid to form hydrogen chloride which appears in the scrubbed effluent and substantially all organic material, other than hydrocarbon, is removed from said effluent, and separately removing from the scrubbing zone the resulting liquid phase and the treated vaporous effluent free from aluminum chloride and consisting of normal butane, isobutane, any lighter hydrocarbons formed in the isomerization step and substantially all of the hydrogen chloride present in the isomerization effluent and formed from said aluminum chloride in said scrubbing step.

9. In a hydrocarbon conversion process wherein conversion is effected in the presence of aluminum chloride catalyst promoted with hydrogen chloride and wherein reaction zone effluents carry over aluminum chloride, the improvement which comprises intimately contacting such effluents in a contacting zone subsequent to the reaction zone with 85% orthophosphoric acid whereby said carry-over aluminum chloride is removed from said effluents by reaction with said orthophosphoric acid and hydrogen chloride is thereby produced, separating from the thus-treated effluents the hydrogen chloride so produced and the hydrogen chloride originally present in said effluents and returning said hydrogen chloride to the said reaction zone as catalyst promoter.

10. In a hydrocarbon conversion process wherein conversion is effected in the presence of aluminum chloride catalyst promoted with hydrogen chloride and wherein reaction zone effluents carry over aluminum chloride, the improvement which comprises intimately contacting such effluents in a contacting zone subsequent to the reaction zone with orthophosphoric acid having a concentration ranging from 50 to 85% whereby said carry-over aluminum chloride is removed from said effluents by reaction with said orthophosphoric acid and hydrogen chloride is thereby produced, separating from the thus-treated effluents the hydrogen chloride so produced and the hydrogen chloride originally present in said effluents and returning said hydrogen chloride to the said reaction zone as catalyst promoter.

11. In a hydrocarbon conversion process wherein conversion is effected in the presence of aluminum chloride catalyst promoted with hydrogen chloride and wherein reaction zone effluents carry over aluminum chloride, the improvement which comprises intimately contacting such effluents in a contacting zone subsequent to the reaction zone with a liquid phosphoric acid containing at least 50% of phosphoric acid whereby said carry-over aluminum chloride is removed from said effluents by reaction with said phosphoric acid and hydrogen chloride is thereby produced, separating from the thus-treated effluents the hydrogen chloride so produced and the hydrogen chloride originally present in said effluents and returning said hydrogen chloride to the said reaction zone as catalyst promoter.

12. In a hydrocarbon conversion process wherein conversion is effected in the presence of aluminum chloride catalyst promoted with hydrogen chloride and wherein reaction zone effluents carry over aluminum chloride, the improvement which comprises intimately contacting such effluents in a contacting zone subsequent to the reaction zone with substantially anhydrous tetraphosphoric acid whereby said carry-over aluminum chloride is removed from said effluents by reaction with said tetraphosphoric acid and hydrogen chloride is thereby produced, separating from the thus-treated effluents the hydrogen chloride so produced and the hydrogen chloride originally present in said effluents and returning said hydrogen chloride to the said reaction zone as catalyst promoter.

13. In a hydrocarbon conversion process wherein conversion is effected in the presence of aluminum chloride catalyst promoted with hydrogen chloride and wherefrom the reaction effluents are withdrawn in vaporous form, which vaporous effluents carry over volatilized aluminum chloride, the improvement which comprises intimately contacting said vaporous effluents in a contacting zone subsequent to the reaction zone with 85% orthophosphoric acid whereby said carry-over aluminum chloride is removed from said effluents by reaction with said orthophosphoric acid and hydrogen chloride is thereby produced, separating from the thus-treated effluents the hydrogen chloride so produced and the hydrogen chloride originally present in said effluents, and returning said hydrogen chloride to the said reaction zone as catalyst promoter.

14. In the isomerization of normal butane to isobutane in the presence of aluminum chloride catalyst promoted with hydrogen chloride and wherefrom the reaction effluents are withdrawn in vaporous form, which vaporous effluents carry over volatilized aluminum chloride, the improvement which comprises intimately contacting said vaporous effluents in a contacting zone subsequent to the reaction zone with 85% orthophosphoric and whereby said carry-over aluminum chloride is removed from said effluents by reaction with said orthophosphoric acid and hydrogen chloride so produced and the hydrogen chloride originally present in said effluents, and returning said hydrogen chloride to the said reaction zone as catalyst promoter.

JOHN W. LATCHUM, Jr.